(12) United States Patent
Baek

(10) Patent No.: US 6,202,941 B1
(45) Date of Patent: Mar. 20, 2001

(54) AGRICULTURE/VITICULTURE SPRAYER

(76) Inventor: Bent Baek, 66 Henry Street, West Croydon, SA 5008 (AU)

(*) Notice: Subject to any disclaimer, the term of this patent is extended or adjusted under 35 U.S.C. 154(b) by 0 days.

(21) Appl. No.: 09/395,653

(22) Filed: Sep. 14, 1999

(30) Foreign Application Priority Data

Sep. 14, 1998 (AU) .................................................. PP5866

(51) Int. Cl.$^7$ ........................................................ B05B 3/02
(52) U.S. Cl. .......................... 239/161; 239/166; 239/172; 239/176
(58) Field of Search ................................... 239/161, 160, 239/159, 164, 167, 166, 172, 176

(56) References Cited

U.S. PATENT DOCUMENTS

| | | |
|---|---|---|
| 2,995,307 | * 8/1961 | McMahon . |
| 3,409,221 | * 11/1968 | Patterson . |
| 3,489,351 | 1/1970 | Patterson . |
| 3,655,130 | 4/1972 | Patrick . |
| 4,439,948 | 4/1984 | Brown . |
| 4,441,655 | * 4/1984 | Blumhardt . |
| 4,709,857 | * 12/1987 | Wilger . |
| 4,736,888 | * 4/1988 | Fasnacht . |
| 4,746,065 | * 5/1988 | Gorder . |
| 4,893,755 | * 1/1990 | Keathley . |
| 5,028,002 | 7/1991 | Whitford . |
| 5,172,861 | 12/1992 | Lenhardt . |
| 5,278,423 | 1/1994 | Wangler . |
| 5,372,305 | 12/1994 | Ballu . |
| 5,740,962 | 4/1998 | Manor . |
| 5,921,019 | 7/1999 | Baek . |

FOREIGN PATENT DOCUMENTS

| | | |
|---|---|---|
| 378518 | 7/1923 | (DE) . |
| A 01 M 7/00 | 8/1985 | (DE) . |
| A 01 M 7/00 | 7/1990 | (DE) . |
| 0 353 132 B1 | 7/1989 | (EP) . |
| 0 382 885 B1 | 8/1989 | (EP) . |
| WO 93/20688 | 10/1993 | (WO) . |

OTHER PUBLICATIONS

D.L. Peterson, H.W. Hogmire–Tunnel Sprayer Dwarf Frut Trees, Mar. 1994, Vo. 37(3) pp. 709–715.
Span Spray Makes Debut in California Vineyard, American Fruit Grower—Feb. 1972, author unknown.
Article concerning Opposition Concerning Australian Patent, date unknown, author unknown.
Greentech Brochure—USA No. 5,921,019.

* cited by examiner

*Primary Examiner*—Andres Kashnikow
*Assistant Examiner*—Christopher S. Kim
(74) *Attorney, Agent, or Firm*—Watts, Hoffmann, Fisher & Heinke Co LPA

(57) ABSTRACT

An agricultural/viticultural sprayer including a pair of curved arms to partially encircle a row of crops such as vines to be sprayed. Each arm carries a plurality of fan spray heads, and each arm is mounted on a support arm rotatable about a vertical pivot, whereby each of the curved arms can be rotated from a transport position to a spread operating position while remaining symmetrical about a plane generally normal to the path of travel when in use.

38 Claims, 13 Drawing Sheets

Figure 1:
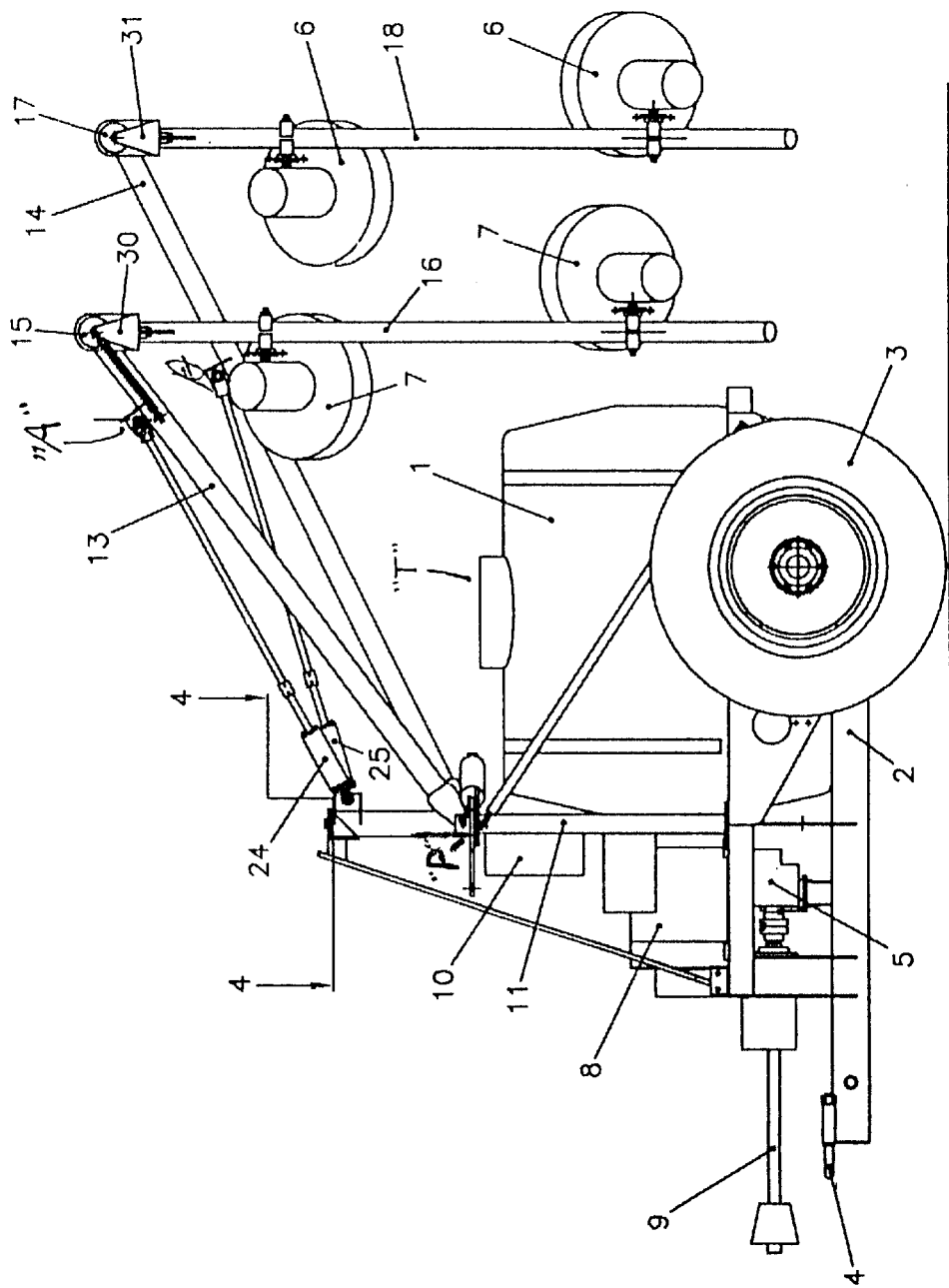

FIGURE 1
SECTION 4–4
SEE FIGURE 4.

SECTION 4-4
SEE FIGURE 4.

FIGURE 3.
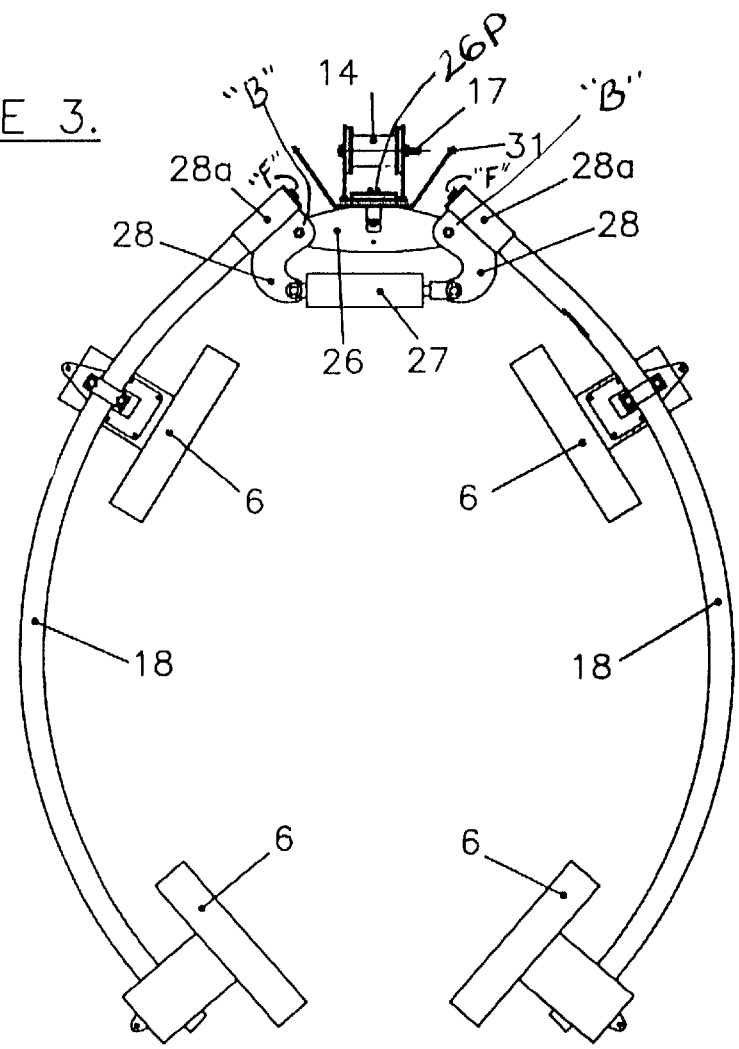
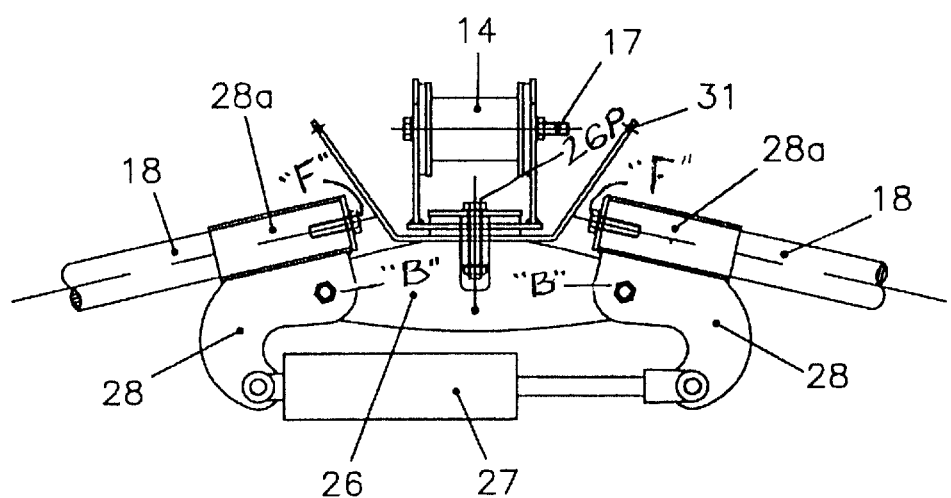
FIGURE 3a.

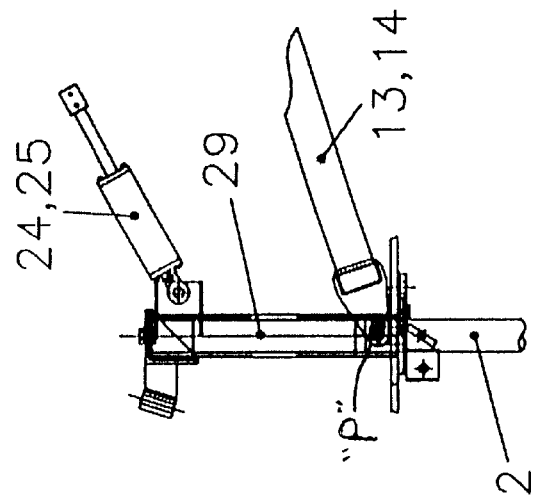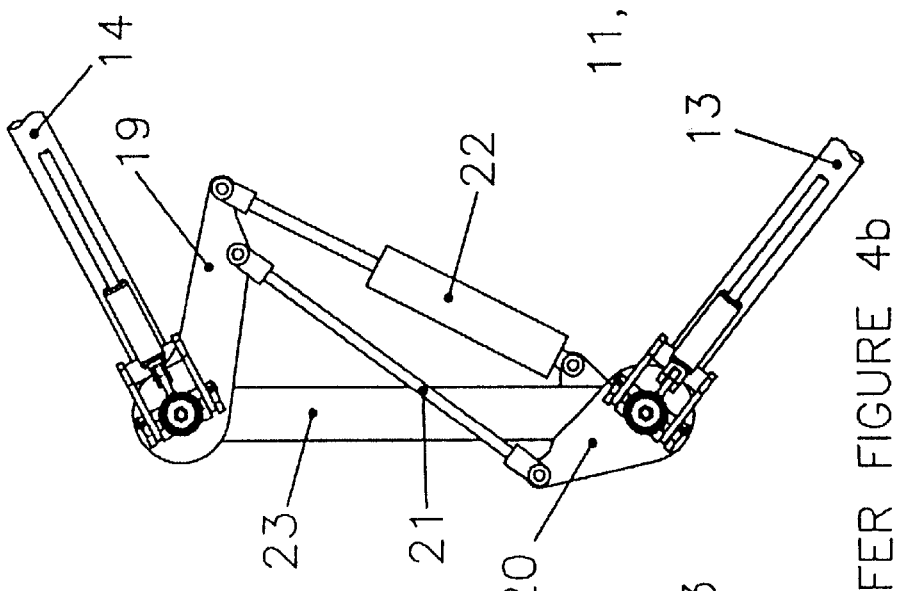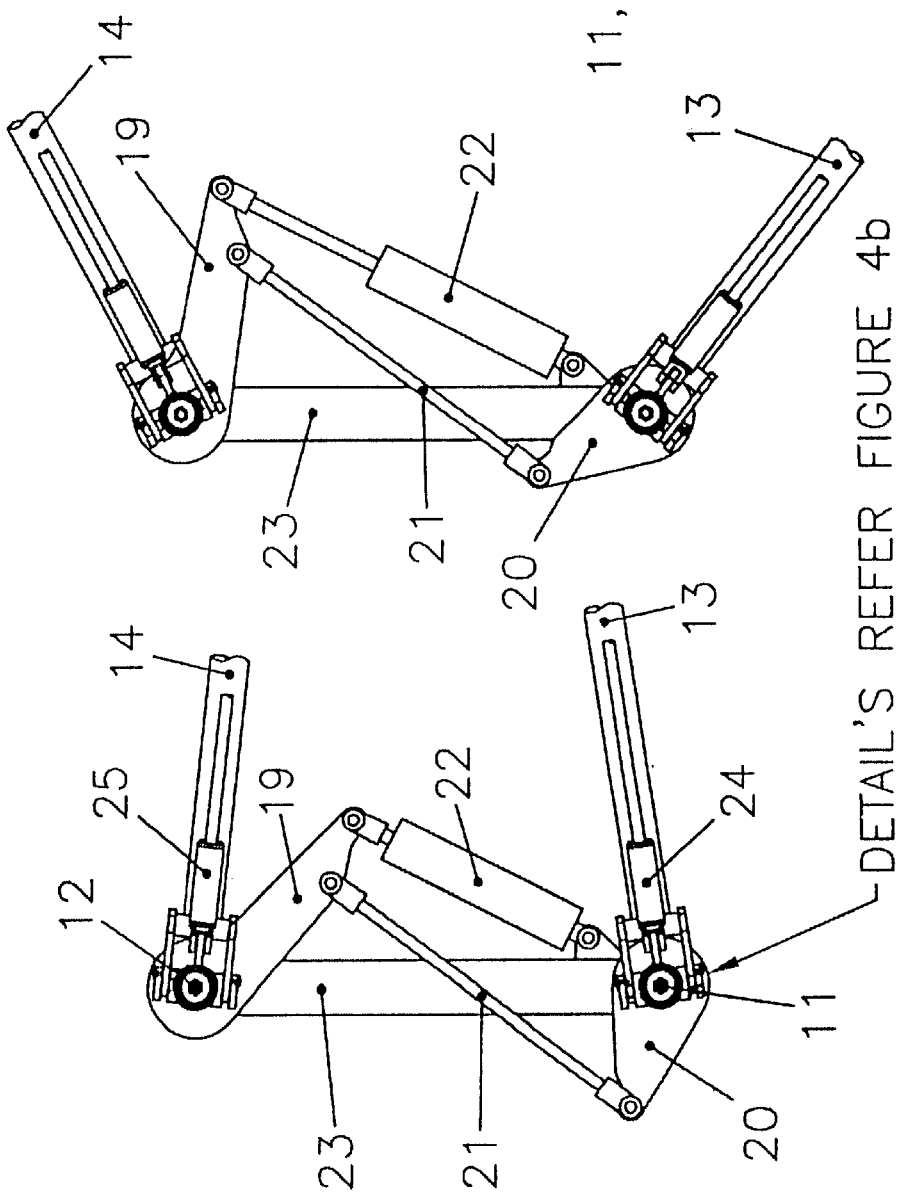

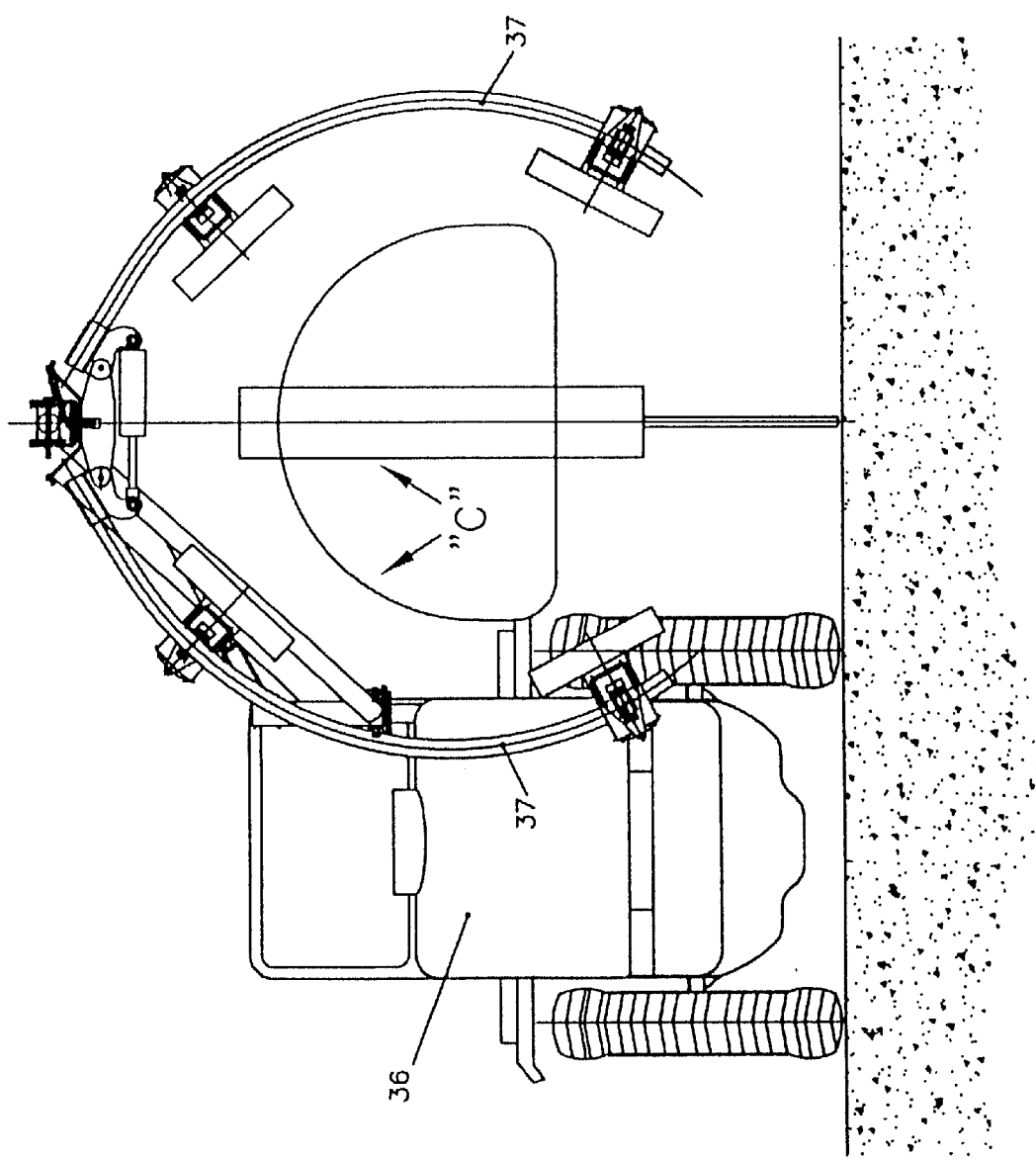

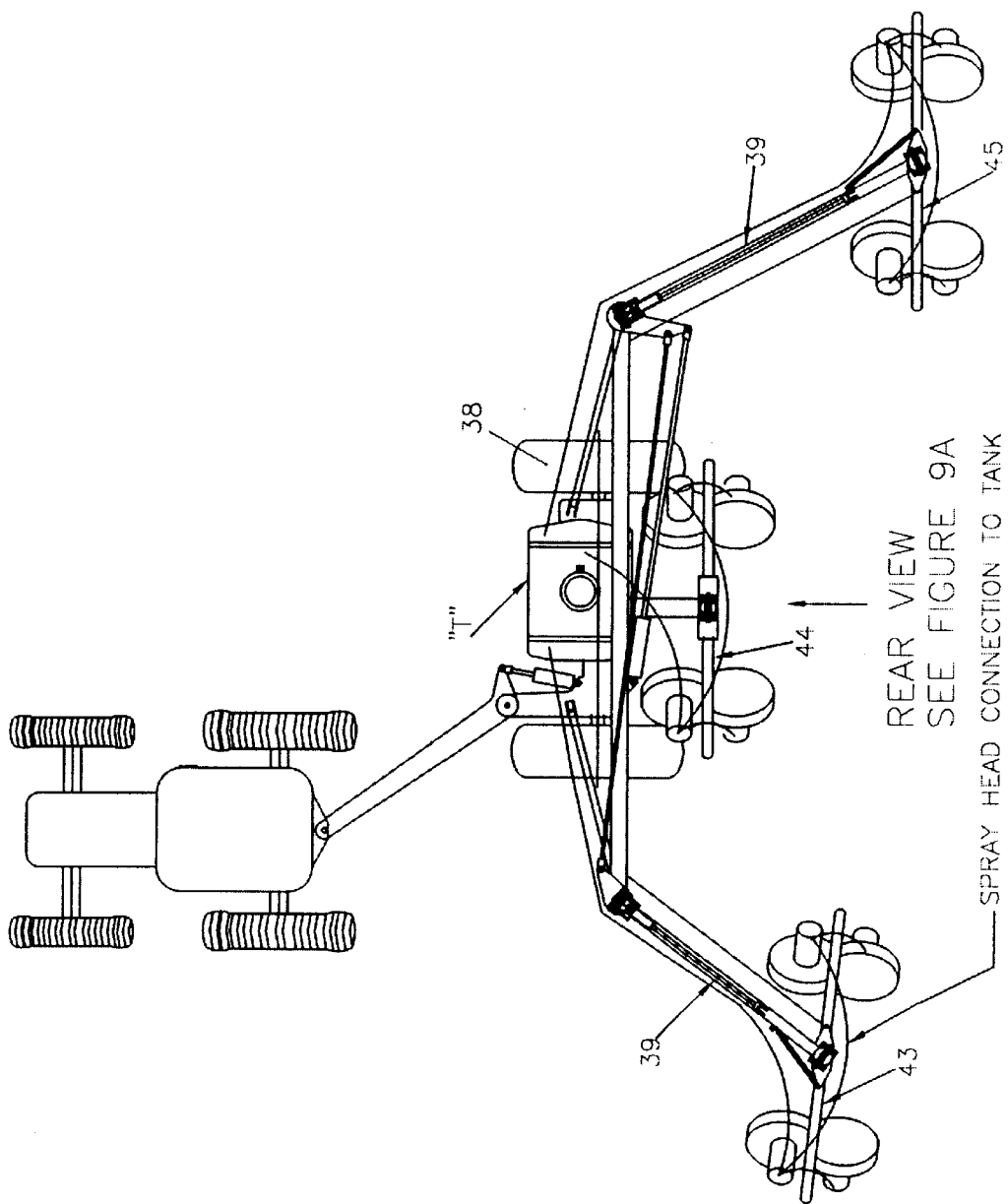

AGRICULTURE/VITICULTURE SPRAYER

FIELD OF THE INVENTION

This invention relates to crop spraying and more particularly to machine especially suited for spraying agricultural chemicals in vineyards and orchards.

BACKGROUND OF THE INVENTION

The spraying of agricultural chemicals in orchards and vineyards utilizing vehicle mounted air blast sprayers is now a long standing practice. Such air blast sprayers use large volumes of high pressure air, require larger tractors and often, if not universally, disperse excessive quantities of agricultural chemicals. Typically, conventional sprayers can only cover one row at a time. Moreover, prior sprayers are not suited for concurrently applying chemicals to two or more rows of crops when the crops are on sloping ground or terraced land.

My U.S. Pat. No. 5,921,019 issued Jul. 13, 1999 discloses and claims a spraying machine which includes at least a pair of curved arms carrying a plurality of fan spray heads. The spray heads are positioned to direct airborne spray material into the canopy of each tree or vine in upward and downward directions simultaneously from both sides of the canopy. While the method and apparatus of my prior patent has enjoyed commercial success and is a very positive advance over the prior art, it was:

Relatively expensive to produce a suitable structural frame to support the spray arms;

Five fan spray heads per vine row is required when travelling at high ground speed;

Generally suitable for large tractor, crop field and large and dense vine canopies;

Not well suited for terraced crops; and,

Can be difficult to transport to a crop field to be sprayed.

SUMMARY OF THE INVENTION

In one form of the invention, a pair of masts are mounted on a trailer vehicle. The trailer supports a tank for transporting agricultural chemicals to be applied as well as a motor and pump arrangement for dispensing the chemicals.

A pair of support arms are pivotally mounted atop the masts and extend rearwardly. The support arms each carry a pair of curved spray arms. Linkages are provided to rotate the support arms relative to the masts about both horizontal and vertical axes. Other linkages are provided to maintain each pair of spray arms symmetrical about an associated imaginary plane normal to the vehicle's path of travel when transported and when in use.

One support arm is shorter than the other in order that the spray arm pairs may be positioned one behind the other in a transport position. The support arms are rotated about their vertical axes to a use position outboard of the vehicle for use in spraying a field.

In order to accommodate sloping and terraced conditions, the support arms are independently pivotable about their respective horizontal axes, such that each pair of spray arms may be positioned at an elevation appropriate for a crop row being sprayed.

The spray arms of each pair are relatively movable between a relatively close transport position and a spaced apart use position. Further linkage is provided to shift the spray arms of each pair relatively between the closed transport and spaced use positions. The support mast linkage maintains a perpendicular orientation of the spray arms with respect to a path of travel when the support arms are pivoted about their vertical pivots to move the arms from transport positions with the spray arms one behind the other for transport and outboard straddling different rows of crops when in their use positions.

Accordingly, the objects of the invention are to provide a novel and improved spraying machine which is more compact and maneuverable than prior art machines and which is capable of concurrently spraying two or more crop rows which are of different heights.

The invention also contemplates variation of the described apparatus having two spray arm pairs to include an apparatus having a single pair of spray arms and a further apparatus supporting three such pairs of spray arms for concurrently applying crop spray to three crop rows.

The invention also contemplates an embodiment in which such spray apparatus is mounted on a self propelled vehicle.

BRIEF DESCRIPTION OF THE DRAWINGS

FIG. 1 is an elevational view of the apparatus of the present invention utilizing a trailer vehicle and two pairs of spray arms;

FIG. 2 is a rear elevational view of the apparatus of FIG. 1;

FIG. 3 is an elevational view of a pair of spray arms and supports;

FIG. 3*a* is an enlarged fragmentary view of the spray arm support and linkage;

FIGS. 4*a* and 4*b* are fragmentary plan views of the mast supported ends of a pair of support arms and the linkage for moving the support arms relative to their supporting masts, while FIG. 4*b* is a fragmentary elevational view thereof;

FIG. 5 is a top plan view of the apparatus of FIGS. 1 and 2 with the arms in their transport positions;

FIG. 6 is a top plan view on a reduced scale of the apparatus of FIG. 5 with the arms positioned in their use positions;

FIG. 7 is a rear elevational view of the apparatus of FIG. 6;

FIG. 7*a* corresponds to FIG. 7, while illustrating the pairs of spray arms positioned at different elevations;

FIG. 8 is a side elevational view of a self propelled version of the apparatus of this invention;

FIG. 8*a* is a rear elevational view of the apparatus of FIG. 8 with the spray arms in their use positions;

FIG. 9 is a top plan view of a version of the present invention utilizing three pairs of spray arms;

FIG. 9*a* is a rear elevational view of the device of FIG. 9; and,

FIG. 10 is a side elevational view of a self propelled version of the present invention utilizing three pairs of spray arms.

DESCRIPTION OF THE PREFERRED EMBODIMENT

Referring now to the drawings and to FIGS. 1–4 in particular, a trailer T is shown. The trailer includes a tank 1 for carrying a supply of agricultural chemicals. The tank is supported on a frame 2. The trailer T is mounted on wheels 3 for transport through a vineyard or orchard being sprayed.

The trailer includes a drawbar 4 for coupling to a pulling vehicle such as a tractor. A pump 5 is mounted on the frame 2 for withdrawing chemicals from the tank 1. Chemicals are transported through conduits not shown to fan type spray heads 6,7. The spray heads are driven by a prime mover 8 which may be either an alternator or a hydraulic pump. The prime mover 8 is powered by the pulling vehicle through a power take-off 9. A control system 10 is provided to control the delivery of power and chemicals to the fans in a known manner.

A pair of masts 11,12 are vertically mounted on the trailer. A pair of elongate, generally horizontal, support arms 13,14 are respectively pivotally mounted on the masts 11,12. A pivot 15 supports a pair of curved spray arms 16 at an outboard or rear end of the masts 13. A pivot 17 supports a corresponding pair of curved spray arms 18 at an outboard or rear end of the mast 14.

A linkage is interposed between the support arms 13,14 and the masts 11,12 for swinging the support arms relative to the masts about horizontal pivots. The linkage includes a bracket 19 secured to the support arm 14 and a further bracket 20 secured to the support arm 13. A link 21 interconnects the brackets 19,20. A cylinder 22 is connected to the bracket 19 and a frame member 23 interposed between and connected to the masts 11,12. An examination of FIGS. 4 and 4a will show that on extension of the cylinder 22, the support arms 13,14 are moved from the transport position of FIG. 4 to the use position of FIG. 4a. Conversely, contraction of the cylinder 22 will shift the support arms 13,14 from the use position of FIG. 4a to the transport position of FIG. 4.

A cylinder 24 is interposed between and connected to the mast 11 and the support arm 13. Similarly, a cylinder 25 is interposed between and connected to the mast 12 and the support arm 14. The cylinders 24, 25 have extended rods respectively pivotally connected to the support arms 13,14 at locations A remote from the masts. Actuation of the cylinders 24,25 are respectively effective to elevate and lower the masts 13,14 by rotation about horizontal pivots P, FIGS. 2 and 4b.

Referring now to FIGS. 3 and 3a, a spray arm support bracket 26 is supported at an outboard end of the support arm 14 for rotation about a horizontal pivot 26P. A pair of spray arm brackets 28 are respectively pivotally connected to the support bracket 26 at B. The spray arm brackets 28 each include a sleeve 28a in which upper ends of the spray arms 18, are mounted. Fasteners F extend through apertured end portions of the sleeves 28a and thread into the arms 18. The fasteners F support the arms 18 in the sleeves 28a while allowing some rotation of each spray arm should one of the spray arms 18 or the spray heads 6 mounted thereon strike an obstruction as the spray apparatus is being transported.

Figure 2:
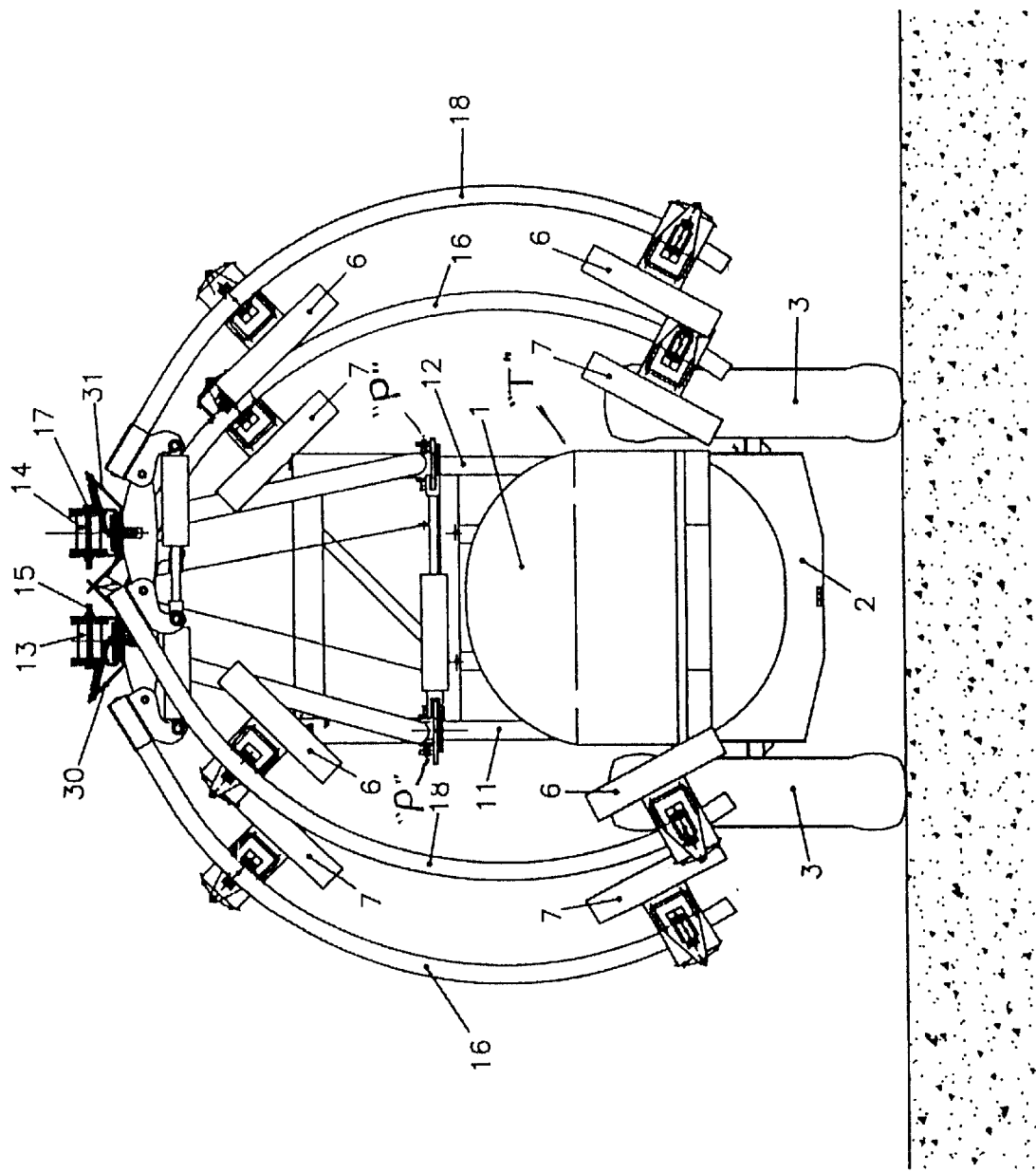
Figure 7:
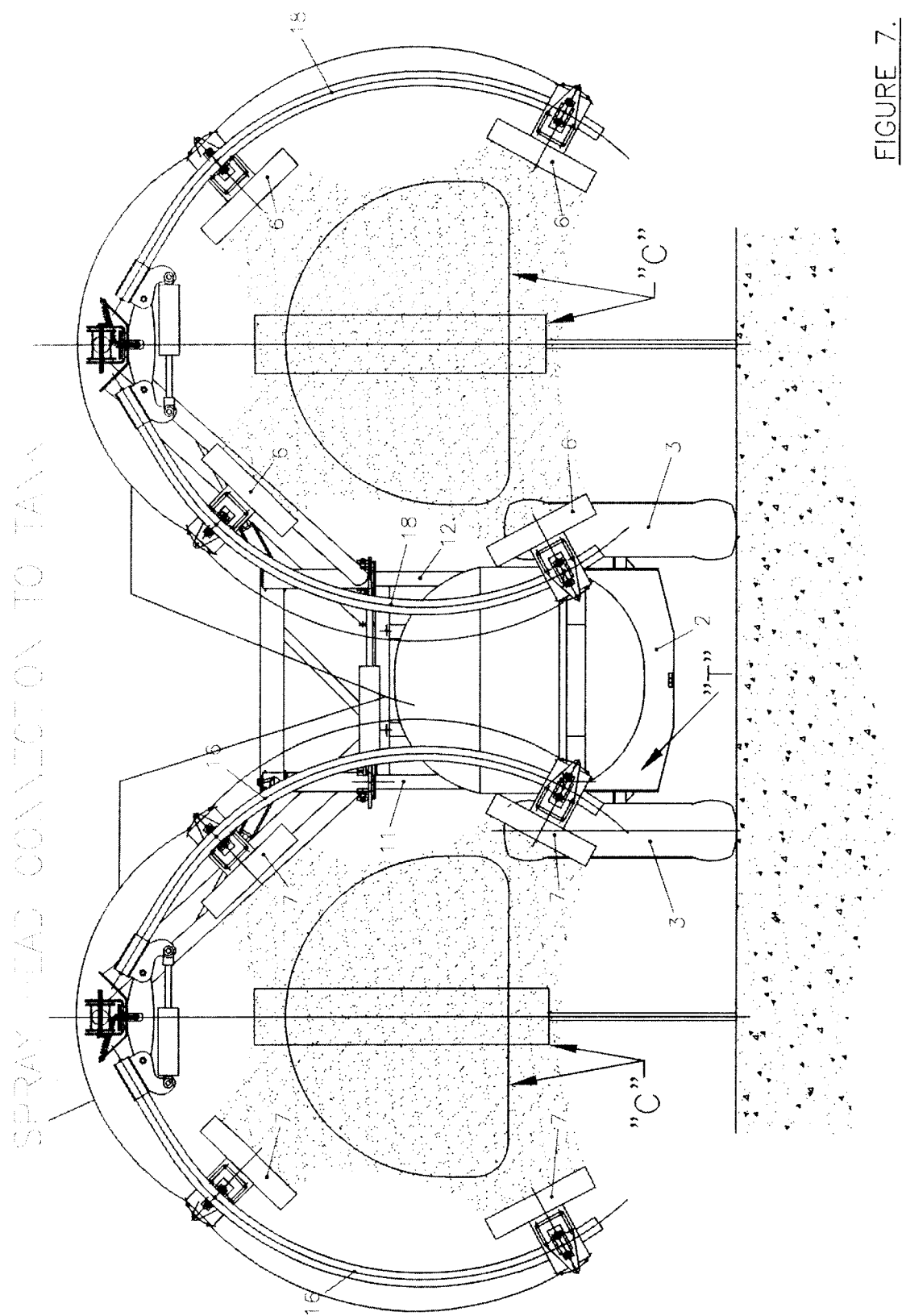

An arm positioning cylinder 27 is interposed between the support arm brackets 28 for moving the arms 18 between their relatively close transport position of FIG. 2 and the use position of FIG. 7. An identical linkage arrangement is interposed between the pair of spray arms 16 which, since it is identical, will not be described further.

Figure 5:
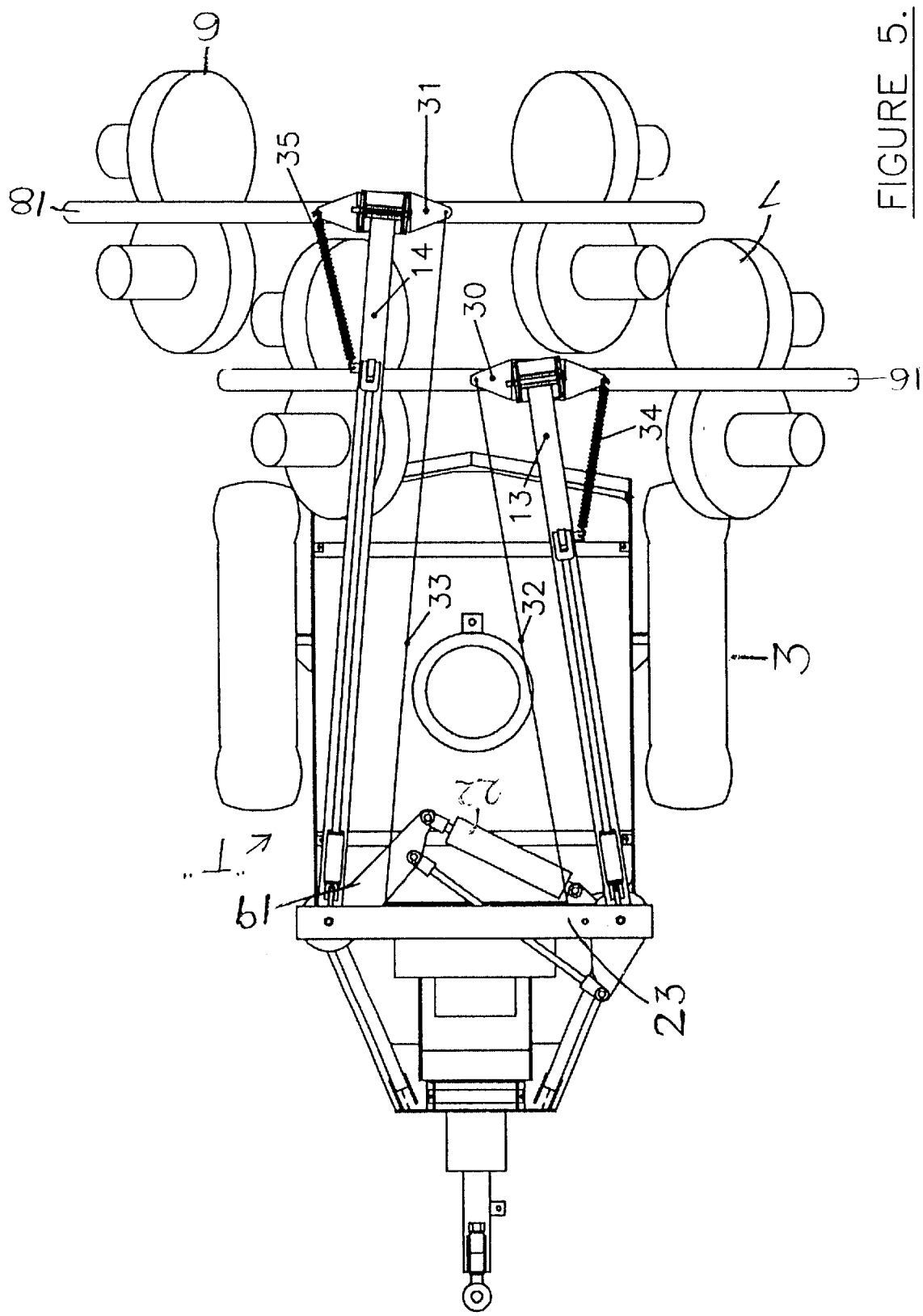
Figure 6:
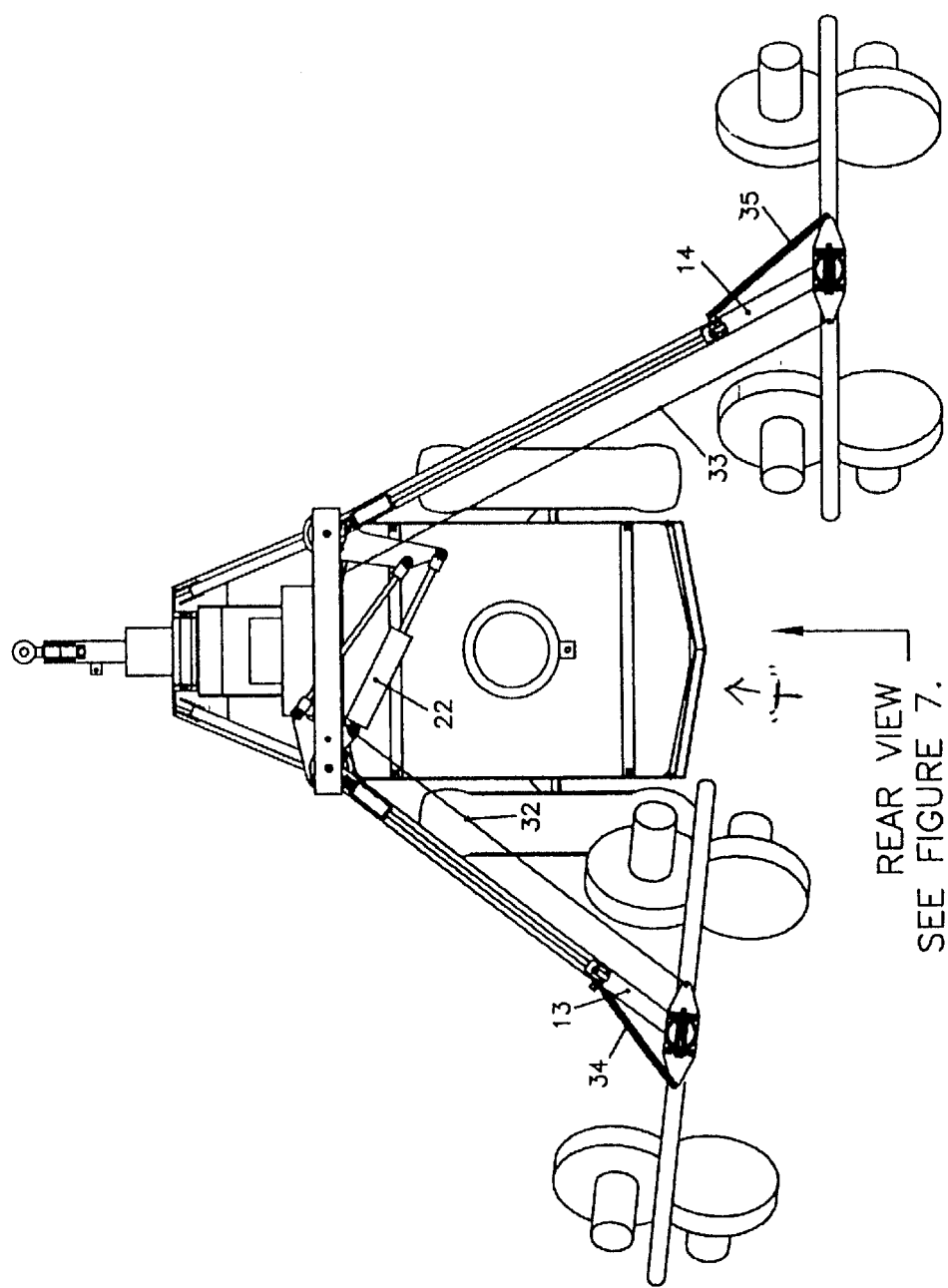

The pairs of spray arms 16,18 are respectively maintained in an orientation such that each is symmetrical about an imaginary plane normal to the path of vehicle travel when the spray apparatus is in use. FIG. 5 best illustrates the mechanism which maintains this orientation of the spray arm pairs as they are moved between their transport positions as shown in FIG. 5 and the use positions as shown in FIG. 6 through actuation of the cylinder 22. Adjuster horns 30,31 are respectively connected to the spray arm support brackets 26 of the arm pairs 16,18. Cables 32,33 respectively extend between the frame member 23 and the adjustor horns 30,31. Springs 34,35 respectively extend between the adjustor horns 30,31 and the support arms 13,14. As the support arms are moved between the transport position of FIG. 5 and the use position of FIG. 6 the cables 32,33 acting against the bias of the springs 34,35 cause the respective spray arm pairs to rotate about their vertical pivots 26P.

Figure 8:
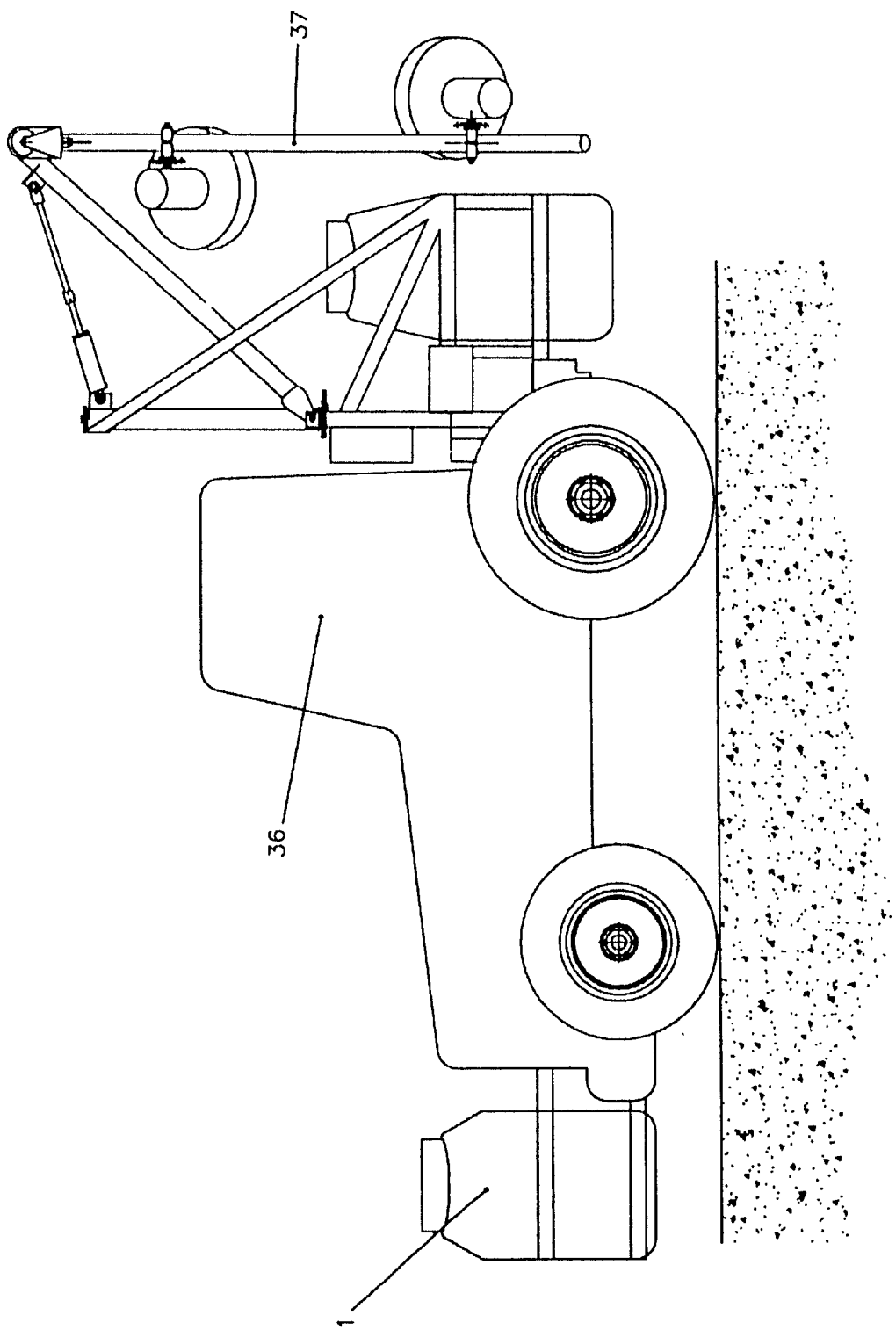

FIGS. 8 and 8a illustrate spray apparatus of the present invention mounted on a tractor 36. Here a single pair of curved spray arms 37 are mounted on the tractor for spraying a canopy C is illustrated in FIG. 8a.

Figure 9A:
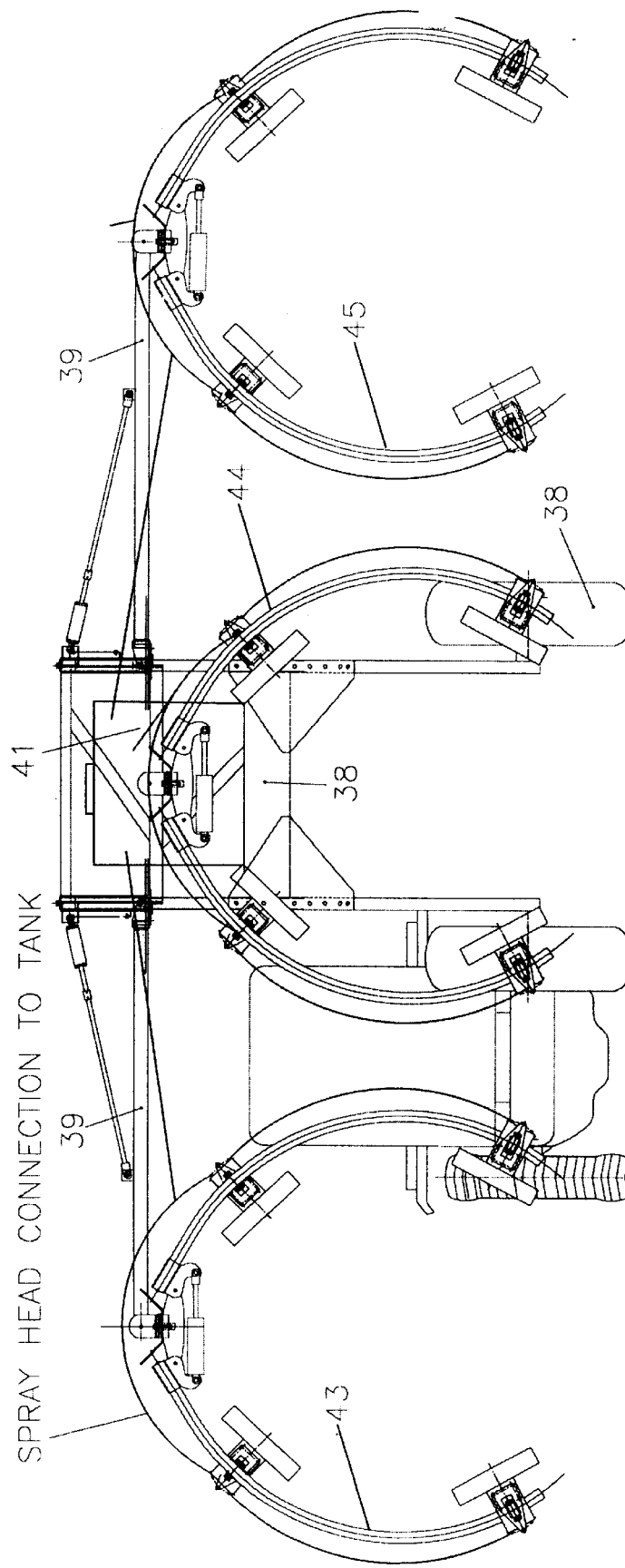
Figure 10:
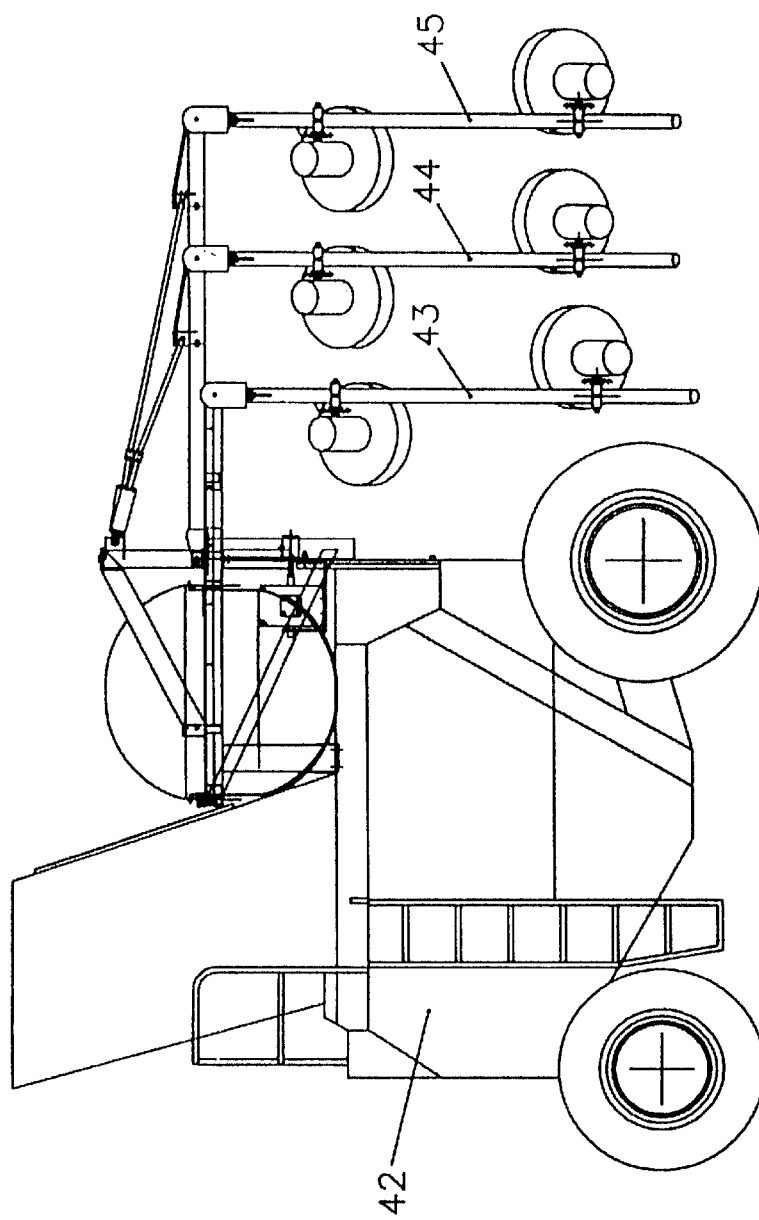

FIGS. 9 and 10 illustrate the apparatus of the present invention utilizing three pairs of spray arms 43,44,45. In FIG. 9 a trailer 38 is provided which is constructed to straddle a center row of three rows of vines, as is best seen in FIG. 9a. The trailer 38 supports the pair of spray arms 44 while a pair of outrigger arms 39 respectively support the pairs of spray arms 43,45 either in the use position shown in FIGS. 9 and 9a or a transport position corresponding to the position shown in FIG. 10 where the spray arm pairs 43,44,45 are mounted on a self propelled vehicle 42.

Operation

In operation the drawbar 4 of the trailer T and the power take-off 9 are coupled to a tractor. The tank 1 is filled with chemicals and the trailer is transported to a location such as a vineyard or orchard to be sprayed. During the transport, the arms are in the storage positions shown in FIGS. 2 and 5. The cylinder 22 is actuated to move the support and spray arms from their transport positions to their use positions as shown in FIG. 7. To position the spray arms at heights appropriate for the size of the plants to be sprayed and to adjust for uneven terrain, where the terrain is uneven, the cylinders 24 and 25 are operated to shift the support arms 13,14 to appropriate elevations as suggested in FIG. 7a the arm positioning cylinders 27 are extended to spread the spray arm pairs into the use positions. Adjustments may be made to the spray arm pairs as to their spacing in the use position according to the sizes of the canopies to be sprayed.

Figure 7A:
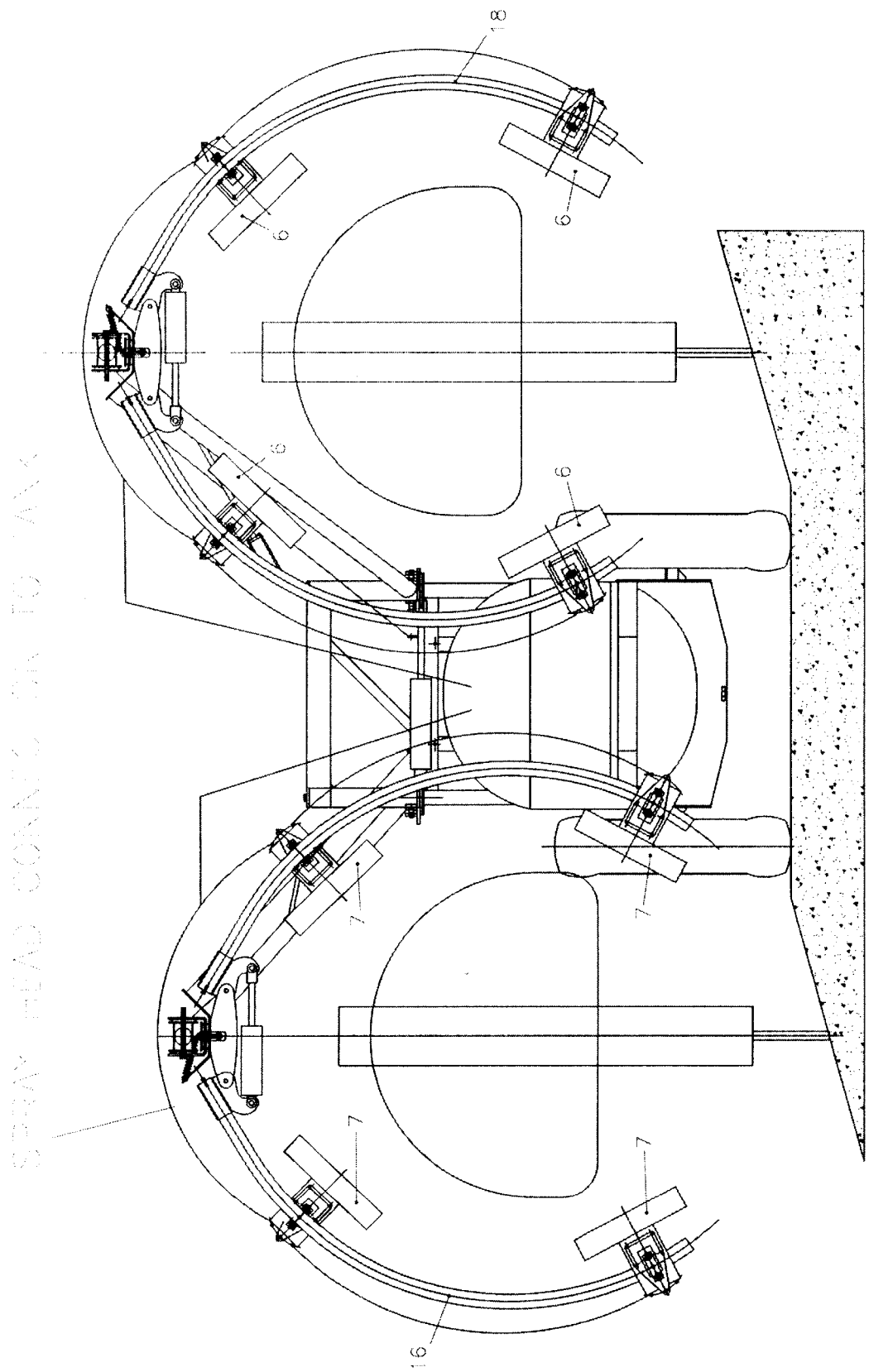

The tractor is now driven between rows as suggested in FIGS. 7 and 7a as the pump 5 and the prime mover 8 are operated under control of the controller 10. The pump 5, through such control, provides appropriate quantities of the chemical to be sprayed to each of the spray heads 6,7 while the prime mover 8 drives spray head fans to blow the spray material into the canopy being sprayed in a known manner.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

What I claim is:

1. A plant spraying apparatus for mounting on a vehicle comprising:

a) a mast for mounting in an upright condition on the vehicle;

b) a support arm rotatably mounted on the mast for rotation about a first generally vertical axis bets operating and transport position;

c) a pair of curved spray head arms respectively pivotally connected to the support arms at pivot locations spaced from the mast, the spray head arms also being connected to the support arm for rotation about a second vertical axis spaced from the first;

d) the spray head arms having transport positions wherein the spray head arms are relatively closely spaced and operating positions spaced apart to straddle a row of crop being sprayed;

e) spray heads carried by the spray arms for effecting plant spraying; and, f) prime mover powered linkages operably connected to the mast and to the arms for alternately positioning the arms in the transport and operating positions while maintaining an imaginary plane located by the spray head arms transverse to a path of vehicle travel.

2. The apparatus of claim 1, wherein there are a pair of masts, a pair of support arms respectively supported on the masts, and two pairs of spray head arms with the pairs being respectively supported by the support arms.

3. The apparatus of claim 2, wherein each pair of spray head arms is rotatable relative to its associated support arm and the linkages maintain imaginary planes respectively located by the pairs of spray arms generally normal to a path of travel of such vehicle when the apparatus is being transported to and through a spray site and when the apparatus is used to spray crops.

4. The apparatus of claim 2, further including further linkage for positioning the pairs of spray head arms at different elevations.

5. The apparatus of claim 1 wherein the spray heads are fan spray heads.

6. The apparatus of claim 2 wherein each of the spray arms carries a plurality of spray heads.

7. The apparatus of claim 1 wherein the spray arms are free to swing relative to the support arm on impact with an obstruction.

8. The apparatus of claim 1 wherein a further prime mover is operably connected to the spray head arms for raising and lowering the spray head arms.

9. The apparatus of claim 1 wherein a space adjusting mechanism is operably interposed between the spray head arms for adjusting the spacing between the spray head arms.

10. A crop sprayer comprising:

a) a vehicle including a spray solution supply tank;

b) a pair of generally vertical masts mounted on the vehicle;

c) a pair of support arms each mounted on an associated one of the masts, the support arms each being pivotal relative tot he associated masts to enable the support arms to be selectively positioned in transport and spraying positions;

d) a pair of powered linkages each operably interposed between associated ones of the mast and the support arms for shifting the support arms between the transport and operating positions;

e) two pairs of spray arms each pair being mounted on an associated support arm;

f) the arms also having transport and scarab positions with the spray arms of each pair being relatively closely spaced when in the transport position and being relatively widely spaced when in their spaying positions;

g) the spray arms of each pair being disposed in an associated imaginary plane disposed normal to a path of vehicle travel when the sprayer is in use;

h) a pair of farther powered linkages each operably connected to an associated pair of spray arms to move the spray arms of the pair between their transport and spraying positions while maintaining the spray arms transverse to the path of travel; and, I) spray heads carried by the spray arms and operably connected to the tank.

11. The sprayer of claim 10, further including a pair of elevation control prime movers each operably interposed between the vehicle and an associated one of the spray arm pairs, each for adjusting the elevation of its associated spray arm pair.

12. The sprayer of claim 11, wherein the elevation control prime movers are fluid cylinders, each cylinder being interposed between an associated one of the masts and the associated support arm.

13. The sprayer of claim 12, wherein the spray heads are fan type.

14. A sprayer as defined in claim 10 wherein the vehicle is a trailed vehicle.

15. A sprayer as defined in claim 10 wherein one support arm is of greater length than the other support arm so that when the arms are in the transport position one support arm extends rearwardly of the other for positioning one pair of spray arms rearwardly of the other pair for transport and ease of maneuvering in restricted areas.

16. A sprayer as defined in claim 15 wherein the support arms are moved between the positions by rotation about generally vertical axes and each pair of spray arms is mounted on a pivot at the end of the associated support arm whereby each of the spray arms is maintained to position the spray heads in a plane generally normal to the path of travel as the support arm rotates about its pivot.

17. A sprayer as defined in claim 16 wherein the spray arms are connected at one side of the arms to a tension member attached to a fixture on the vehicle and a spring on the other side of the arms maintains tension in the tension member, the tension member thus maintaining the orientation of the spray arms relative to such rows.

18. A sprayer according to claim 10 wherein there are two masts and two pairs of spray arms whereby to enable spraying of a canopy row on each side of the vehicle.

19. The sprayer as defined in claim 10 wherein there are three pairs of spray arms, whereby when in use one pair sprays a canopy row being straddled by the vehicle and the other pairs spray canopy rows on either side of the vehicle.

20. A sprayer as defined in claim 10, wherein the vehicle is a self propelled machine for straddling a canopy row, and the vehicle carries a selected one of one, two and three pairs of spray arms.

21. The sprayer of claim 20, wherein the spray heads are fan type.

22. A process of spraying crop rows comprising;

a) transporting a spray vehicle to a location of a crop to be sprayed as a support arm and a suspended pair of spray arms are maintained in a transport position with the spray arms generally behind the vehicle and the pair of spray arms being generally symmetrical about an imaginary plane disposed generally normal to the path of travel;

b) shifting the spray arms and the support arm to a spraying position by rotating the support arm about a vertical axis relative to the vehicle while concurrently moving the spray arm pair relative to the support arm about another vertical axis to maintain said imaginary plane generally normal to a vehicle path of travel when the arms are moved to and into the spraying position; and, c) operating the vehicle in the crop location while applying a chemical spray to the crop.

23. The process of claim 22, wherein there are at least two support arms each supporting a spray arm pair.

24. The process of claim 23, wherein relative height of the spray arm pairs are relatively adjusted following the transport step and prior to the operating step.

25. The process of claim 24, wherein relative spacing of the spray arm pairs are relatively adjusted following the transport step and prior to the operating step.

26. The process of claim 23, wherein relative spacing of the spray arm pairs are relatively adjusted following the transport step and prior to the operating step.

27. The process of claim 22, wherein relative height of the spray arm pair is adjusted following the transport step and prior to the operating step.

28. The process of claim 27, wherein relative spacing of the spray arms is adjusted following the transport step and prior to the operating step.

29. The process of claim 22, wherein relative spacing of the spray arms is adjusted following the transport step and prior to the operating step.

30. The process of claim 22, wherein the relative spacing of the spray arms is adjusted following the transport step and prior to the operating step.

31. A process of spraying canopy rows comprising:
   a) transporting a spray vehicle to a location of a crop to be sprayed as a supporting arm and a supported pair of spray arms are maintained in a transport position with the spray arms generally behind the vehicle;
   b) shifting the arms to a spraying position including rotating the supporting arm relative to the vehicle while concurrently rotating orientation of the spray arms relative to the support arm to maintain the spray arms in an imaginary plane transverse to a path of vehicle travel, adjusting the elevation of the spray arm pair such that the arm pair is at an appropriate elevation for a crop row to be sprayed; and,
   c) operating the vehicle in the crop location while applying a chemical spray to the canopy row with fan head sprayers.

32. The process of claim 31, wherein there are at least two support arms each supporting a spray arm pair.

33. The process of claim 31, wherein the relative spacing of the spray arm pairs are relatively adjusted following the transport step and prior to the operating step.

34. Spray apparatus for spraying fruit bearing vegetation such as vineyards comprising:
   a) a wheeled vehicle;
   b) a pair of support masts mounted on the vehicle;
   c) a pair of support arms each being pivotably mounted on a respective and associated one of the masts for rotation about generally vertical axes;
   d) two pairs of spray arms each spray arm pair being rotatively mounted on a respective and associated one of the support arms for rotation relative to their respective associated spray arms about respective generally vertical axes;
   e) a pair of spacing adjustment mechanisms each operably connected to the arms of an associated one of the pairs of spray arms for adjusting the spacing of the associated spray arm pair;
   f) at least two elevation control fluid cylinders each interposed between an associated support arm and the vehicle for adjusting he elevation of the associated support arm and associate pair of spray arms;
   g) a plurality of fan type spray heads each connected to a spray arms such that at least one spray head is connected to each of the spray arms; and
   h) mechanism to cause concurrent pivoting of each spray arm and the rotation of the associated spray arm pair whereby to maintain a substantially constant orientation of an imaginary plane located by the associated spray arm pair transverse to a path of vehicle travel.

35. A trailed vehicle spraying machine adapted to spray rows of vines or trees, comprising:
   a) two pairs of curved spray arms carrying a plurality of fan spray heads and mounted on a vehicle, characterized in that the pairs of curved arms are rotatable and movable from a transport position to an operating position extending backwards and sideways from the vehicle;
   b) two support arms respectively supporting the two pairs of curved arms, one pair on each side of the vehicle, one support arm being of greater length than the other support arm so that when the spray arm pairs are in a transport position one pair is positioned rearwardly of the other for transport and ease of maneuvering in restricted areas; and
   c) wherein each pair of spray arms is mounted on a first pivot at the end of the its support arm whereby each of spray arms is maintained in an orientation to position the fan spray heads generally normal to such a row as the support arm rotates about another pivot.

36. A spraying machine as defined in claim 35 wherein the spray arms adjacent the first pivots are connected at one side to a tension member attached to a fixture on the machine and a spring on the other side to maintain the tension in the tension member, the tension member thus maintaining the orientation of the spray arms.

37. Spray apparatus for spraying hit bearing vegetation such as vineyards comprising:
   a) a wheeled vehicle,
   b) a pair of support masts mounted on the vehicle;
   c) a pair of support arms each being pivotably mounted on a respective and associated one of the masts for rotation about generally vertically axes;
   d) two pairs of spray arms each spray arm pair being rotatively mounted on a respective and associated one of the support arms for rotation about respective generally vertical axes;
   e) a pair of spacing adjustment mechanisms each operably connected to the arms of an associated one of the pairs of spray arms for adjusting the spacing of the associated spray arm pair;
   f) at least two elevation control fluid cylinders each interposed between an associated support arm and the vehicle for adjusting the elevation of the associated support arm and associate pair of spray arms;
   g) a plurality of fan type spray heads each connected to a spray arm such that at least one spray head is connected to each of the spray arms; and,
   h) each of the spray arms being rotatively connected to its associated support arm whereby each spray arm will rotate rearwardly upon impact with an obstruction as the vehicle is moving in a forward direction.

38. Spray apparatus for spraying fruit bearing vegetation such as vineyards comprising:
   a) a wheeled vehicle;
   b) a pair of support masts mounted on the vehicle;
   c) a pair of support arms each being pivotably mounted on a respective and associated one of the masts for rotation about general vertically axes;
   d) two pairs of spray arms each spray arm pair being rotatively mounted on a respective and associated one of the support arms for rotation about respective generally vertical axes;

e) a pair of spacing adjustment mechanisms each operably connected to the arms of an associated one of the pairs of spray arms for adjusting the spacing of the associated spray arms pair;

f) at least two elevation control fluid cylinders each interposed between an associated support arm and the vehicle for adjusting the elevation of the associated support arm and associate pair of spray arms;

g) a plurality of fan type spray heads each connected to a spray arms such that at least one spray head is connected to each of the spray arms; and, h) each of the spray arms being relatively freely rotatable about an axis transverse to the vertical whereby to allow each such arm to yield to an obstruction on impact.

* * * * *